United States Patent [19]

Heaney et al.

[11] Patent Number: 5,548,467
[45] Date of Patent: Aug. 20, 1996

[54] LAN INTERFACE WITH SIMPLIFIED OVERCURRENT PROTECTION

[75] Inventors: James A. Heaney, Durham; Todd M. Rasmus, Cary, both of N.C.

[73] Assignee: International Business Machines Corporation, Armonk, N.Y.

[21] Appl. No.: 195,246

[22] Filed: Feb. 14, 1994

[51] Int. Cl.⁶ .................................................. H02H 3/00
[52] U.S. Cl. ................... 361/93; 361/18; 323/277
[58] Field of Search ............................. 361/93, 62, 64, 361/66, 71, 88, 18, 31; 323/277, 275

[56] References Cited

U.S. PATENT DOCUMENTS

| Re. 33,941 | 5/1992 | Lorinez et al. | 361/87 |
|---|---|---|---|
| 4,404,473 | 9/1983 | Fox | 307/125 |
| 4,860,154 | 8/1989 | Fazlollahi | 361/101 |
| 5,181,155 | 1/1993 | Beg et al. | 361/91 |
| 5,245,523 | 9/1993 | Juzswik | 363/56 |
| 5,319,515 | 6/1994 | Pryor et al. | 361/93 |

FOREIGN PATENT DOCUMENTS 60-84008  5/1985  Japan ............................. H03K 17/08

Primary Examiner—Jeffrey A. Gaffin
Assistant Examiner—S. Jackson
Attorney, Agent, or Firm—Steven B. Phillips

[57] ABSTRACT

A local area network (LAN) interface port with a simple overcurrent protection circuit which isolates the power supply connection for the port from fault conditions on the LAN. The circuit has a normally-on field effect pass transistor in line with the load terminal. The pass transistor shuts off when a fault condition is detected. Such a condition is detected when the voltage across a sense resistor becomes greater than the voltage across a reference resistor. A current mirror is made up of a transistor array and the sense and reference resistors. The current mirror compares the two voltages, and a bipolar transistor switches the gate voltage of the pass transistor on when the fault condition is detected. The design is particularly useful with the LAN system specified in ANSI/IEEE Standard 802.3, commonly known as Ethernet.

10 Claims, 4 Drawing Sheets

LAN INTERFACE WITH SIMPLIFIED OVERCURRENT PROTECTION

BACKGROUND

1. Field of the Invention

This invention relates to overcurrent protection for power supply systems. It is particularly useful in a local area network (LAN) system where a LAN interface supplies power to other devices on the network. It is applicable to a wired LAN interface no matter what type of device the interface is used with, be it an adapter card, a bridge, a repeater, or some other device with a LAN interface port that supplies power to other devices to which it is connected.

2. Prior Art

Overcurrent protection circuits are well known in the art. Often, these circuits are very complex, requiring many components. The circuit disclosed in FIG. 3 of U.S. Pat. No. 4,404,473 to Fox is a good example of a fairly complicated overcurrent protection circuit. Prior art overcurrent protection circuits also often have the disadvantage of requiring multiple, separate power supply voltages. An overcurrent protection circuit that requires multiple supply voltages for proper operation is disclosed in U.S. Pat. No. 5,245,523 to Juzswik.

These limitations have become increasingly important, as overcurrent protection circuits in modern times are required in devices and systems where cost and space are critical considerations in design decisions. An example of a system in which cost and space are important is a local area network (LAN) in which a voltage is supplied to an interface port, which in turn powers other devices on the network through a cable. Such a LAN is described in ANSI/IEEE Standard 802.3, "Information Processing Systems—Local Area Networks," 1989, which specifies a LAN commonly known as "Ethernet" and which is incorporated herein by reference. In Ethernet, an attachment unit interface (AUI) port provides a 12 volt supply voltage over a cable to a medium attachment unit (MAU). The AUI port can be found in various Ethernet devices, such as repeaters and adapter cards for personal computers. Overcurrent protection is required at this interface, since a low impedance fault such as a short circuit in a cable or an MAU can disrupt the supply voltage to other MAUs and cause a single point failure. What is needed for this interface is a very simple overcurrent protection circuit with few components which can be operated using the 12 volt AUI supply voltage already present at the Ethernet AUI interface.

SUMMARY

The present invention provides an overcurrent protection circuit that can be used on a LAN interface which provides power to other devices on the LAN. The circuit includes a normally-on field effect pass transistor and a sense resistor in series between the input voltage terminal of the circuit and the load terminal. A four-terminal transistor array is used to monitor the voltage across the sense resistor, which is proportional to the current being drawn by the load. The transistor array, the sense resistor and a reference resistor form a current mirror. When the sense resistor voltage becomes greater than the voltage across the reference resistor, the current through one side of the transistor array decreases, and a bipolar, NPN transistor which normally keeps the gate of the pass transistor shorted to ground, shuts off. This causes the gate of the pass transistor to be pulled up to the supply voltage because it is connected to the supply voltage terminal via a resistor. The pass transistor then shuts off, causing the supply voltage to be isolated from the load.

As the pass transistor shuts off, the node voltages biasing the transistor array decrease, reducing further the bias to the bipolar transistor. Reinforced by this positive feedback, the bipolar transistor stays shut off. The gate for the pass transistor stays high because it is coupled to the input voltage terminal through a resistor. The LAN interface stays isolated from the load devices on the network until the circuit is powered off and back on again, usually after an operator or service technician has determined the cause of the fault condition and repaired it.

The circuit described above is very useful in an Ethernet AUI interface, where it guards against overcurrent conditions on the 12 volt supply connection of the interface. If the interface did not have overcurrent protection, such overcurrent conditions could cause damage to the interface or cause a single point failure on the Ethernet LAN which in some cases supports multiple AUI connections to MAUs.

The invention has the advantage of providing a very simple overcurrent protection circuit with few components. This simplicity saves space and cost. Another advantage of the invention is that the overcurrent protection circuit operates from the voltage which is normally supplied to the LAN interface port. Thus no separate, additional power supply voltages are required.

DETAILED DESCRIPTION

Figure 1:
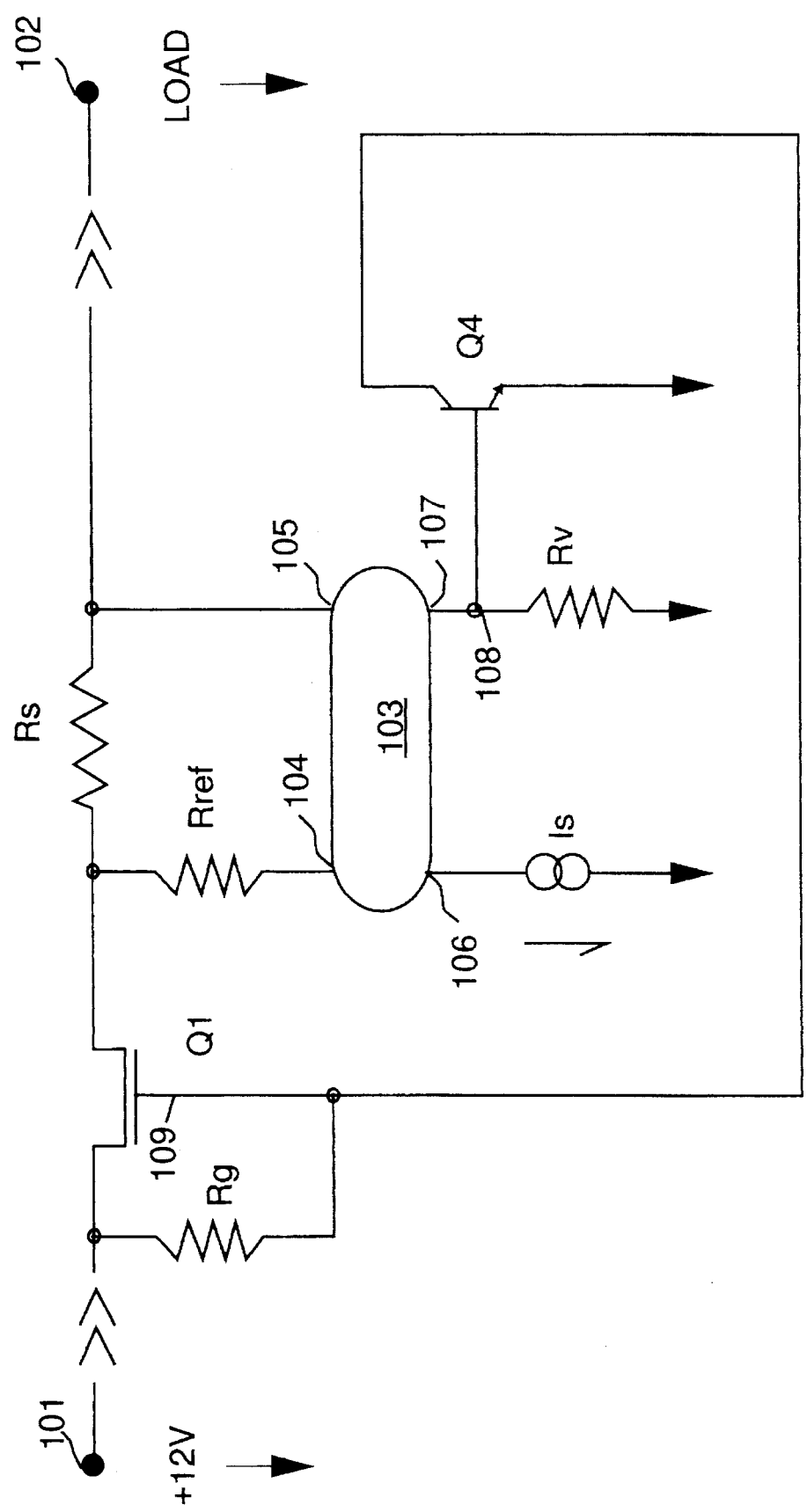
FIG. 1 is a general schematic diagram of the circuit of the present invention.

The basic schematic diagram of the overcurrent protection circuit is shown as FIG. 1. Voltage and current is input to the circuit at the voltage input terminal 101. For Ethernet, this voltage is 12 volts. Q1 is a normally-on, field-effect pass transistor that acts as a switch to cut off the current being drawn by the circuit when an overcurrent condition is detected. This condition is determined by essentially monitoring the voltage across a sense resistor Rs which is in series with the pass transistor and connected to the load terminal 102.

A transistor array is shown at 103. The transistor array has a first terminal 104, a second terminal 105, a third terminal 106, and a fourth terminal 107. The circuit also includes a reference resistor Rref with one terminal connected between the pass transistor and sense resistor, and the other terminal connected to the first terminal 104 of the transistor array. Additionally, a means for generating a reference current, such as a constant current source Is is connected between the third terminal 106 of the transistor array and ground. The transistor array is used to monitor the voltage across the sense resistor, that voltage being proportional to the current being drawn by the load. The transistor array 103 and the resistors Rs and Rref form a current mirror. The details of the operation of the transistor array and the current mirror will be explained later.

Central to the operation of the circuit of FIG. 1 is a means for shutting off the pass transistor Q1 when the current flowing into the second terminal 105 of the transistor array becomes less than the current flowing into the first terminal 104 of the transistor array. Since the pass transistor is normally on, it is on when its gate 109 is grounded, and off when its gate 109 is pulled up to the voltage potential of the supply terminal 101 through resistor Rg. In the embodiment of FIG. 1, the means for shutting off the pass transistor consists of the NPN transistor Q4, the resistor Rv connected between the base 108 of transistor Q4 and ground, and the resistor Rg connected between the input voltage terminal of the circuit and the gate of the pass transistor Q1. The collector of transistor Q4 is connected to the gate 109 of the pass transistor Q1.

The circuit of FIG. 1 operates in two modes, one in which the pass transistor Q1 is on and one in which it is off. With the transistor Q1 on in normal operation, the current drawn from the supply terminal 101 creates a voltage drop across the sense resistor Rs. This voltage drop is compared with the voltage drop across the reference resistor Rref as determined by the value of Rref x Is, where Is is the reference current. As long as the value of Rref is chosen correctly, so that the voltage drop across the reference resistor Rref is significantly greater than the voltage drop across the sense resistor Rs in normal operation, the current through the transistor array flowing into the second terminal 105 and out of the fourth terminal 107 will be great enough to cause the voltage across the resistor Rv to be high enough to keep transistor Q4 saturated, thus pulling the gate 109 of the pass transistor Q1 to ground and keeping it on.

In the event of an overcurrent fault condition, the circuit switches into the mode in which the pass transistor Q1 is off. When a fault condition occurs, the voltage drop across the sense resistor Rs becomes greater because more current is being drawn from the load terminal 102. Eventually, the voltage drop across the resistor Rs becomes so great that the current flowing into the second terminal 105 and out of the fourth terminal 107 of the transistor array begins to fall off because the transistor array 103 cannot operate properly if the voltage on one side is substantially less than the voltage on the other. Once this current, which also flows through resistor Rv drops off, the voltage at the base 108 of transistor Q4 becomes low; the transistor Q4 shuts off, and the gate of the pass transistor Q1 is pulled up to near the potential of the voltage input terminal 101 through resistor Rg. The voltage and current to the circuit and the load is now cut off, and continuously reinforced by positive feedback. The circuit can be reset by powering it off and back on.

Figure 2:
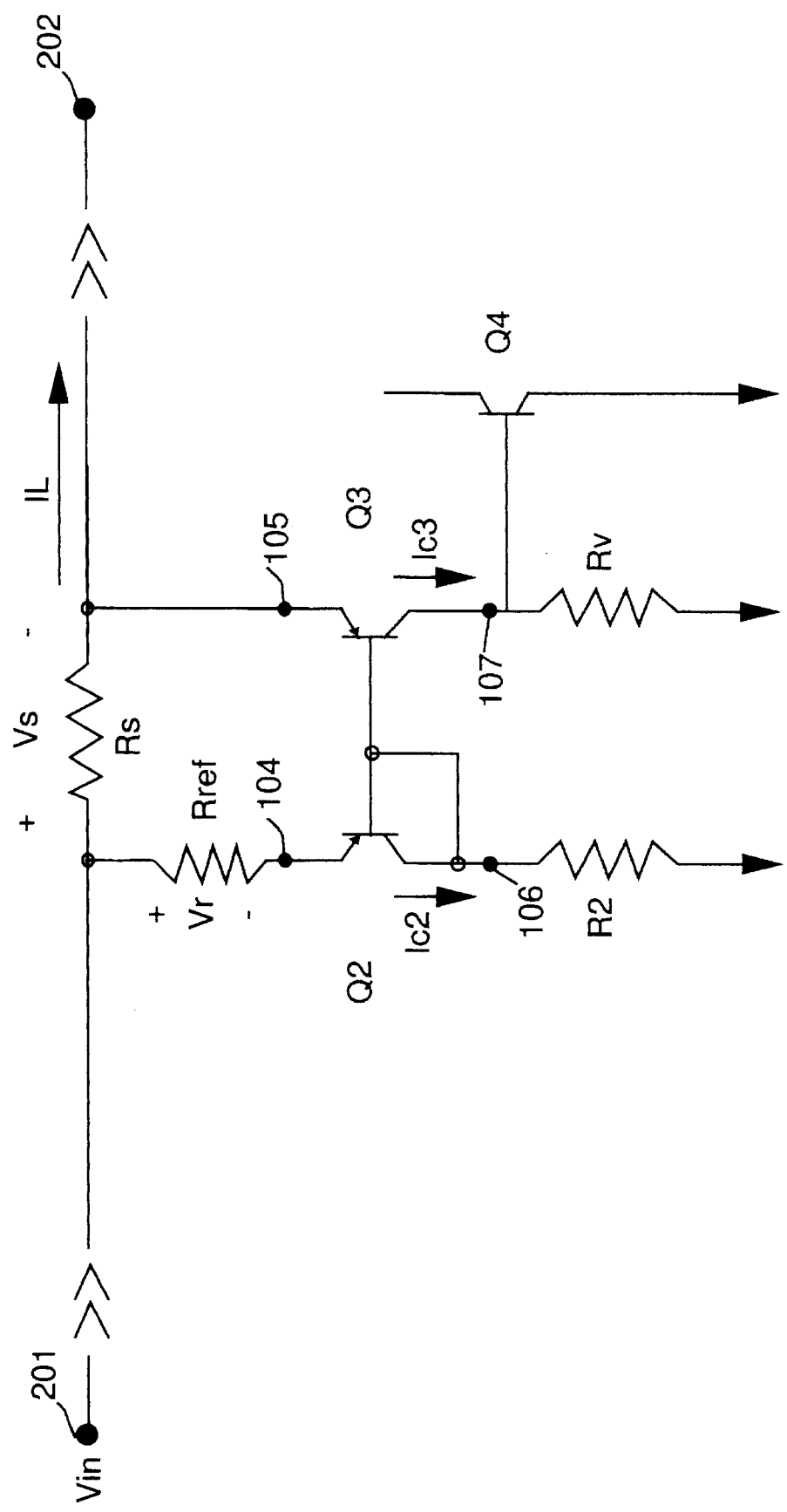
FIG. 2 shows the current mirror section of the circuit of FIG. 1 with the currents and voltages labeled for reference.

FIG. 2 shows the design detail of the transistor array and current mirror in the preferred embodiment, as well as what voltages and currents must be considered in selecting resistor values. In FIG. 2, the terminal into which current flows from the pass transistor Q1 of FIG. 1 is shown at 201. The output or load terminal is shown at 202. The transistor array is the most common type, made up of two substantially identical PNP transistors, a first PNP transistor Q2 and a second PNP transistor Q3. Transistor arrays of this type are well known in the art, and can use two or more than two transistors. For example, U.S. Pat. No. 4,860,154 to Fazlollahi shows a similar prior-art transistor array and is incorporated herein by reference. The terminals of the transistor array 103 of FIG. 1 are marked in FIG. 2 with the same reference numbers. With a transistor array of this type, a single fixed resistor R2 is all that is needed for a constant current source.

The design equation to be used in selecting resistor values can be easily derived through known node and mesh analysis, and is:

$$Vs - Vr = Vt \times \ln \frac{Ic2}{Ic3}$$

where Vt is the volt-equivalent of temperature, commonly defined by the numeric product of Boltzmann's constant (k) and temperature (in Kelvin), divided by electronic charge (11,600). The value of Vt at a temperature of 25 C. is approximately 0.026 volts. Resistor values are selected to yield equal currents in the transistor array at the maximum allowable current drawn from the load terminal 202, while allowing the voltage drop across resistor Rv to be sufficiently large enough to keep transistor Q4 fully saturated during normal operation.

Figure 3:
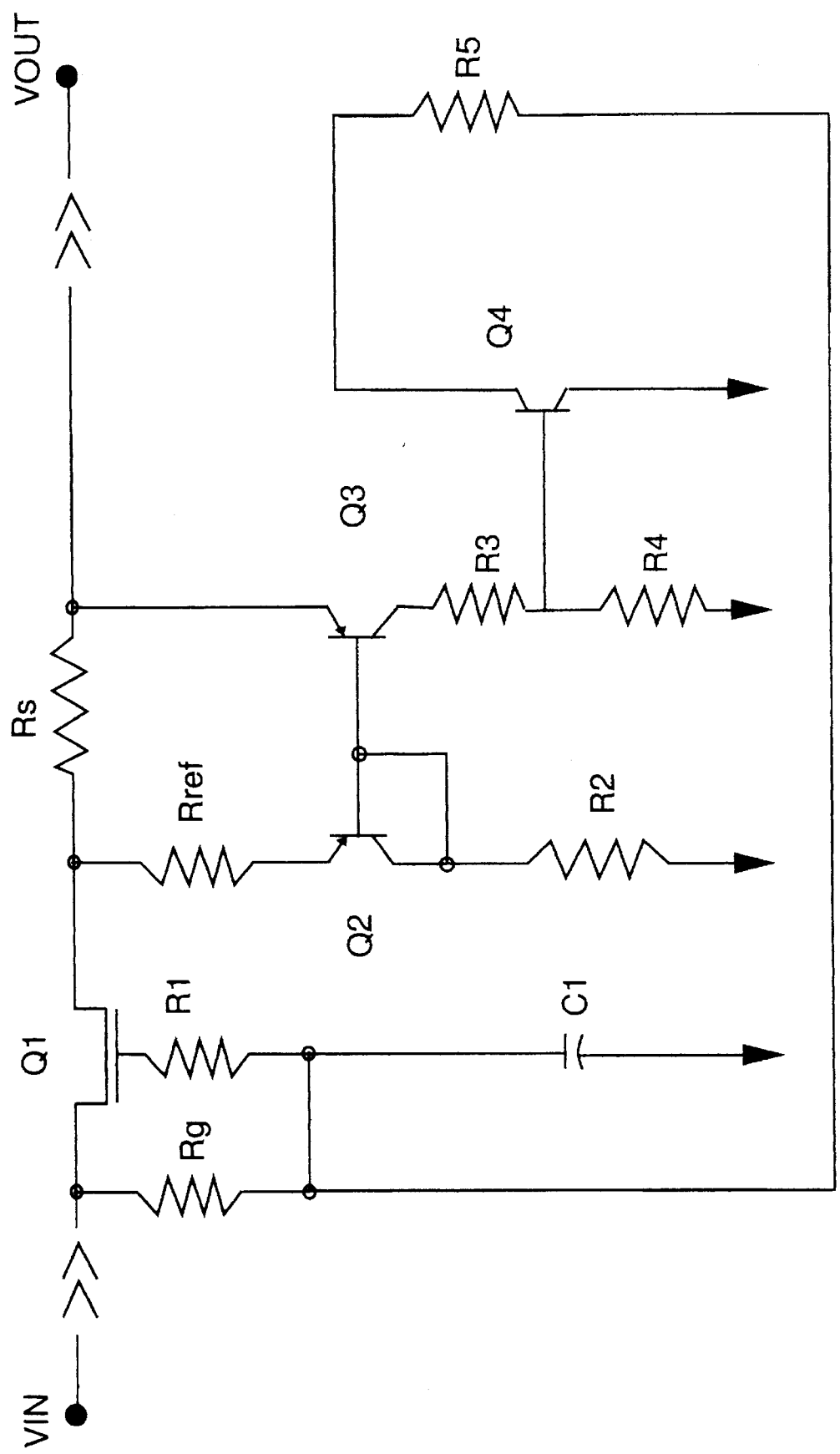
FIG. 3 shows the detail of a specific embodiment of the present invention.

FIG. 3 shows the complete detail of the preferred embodiment of the overcurrent protection circuit of the present invention. Most of the circuit is identical to what has already been described. In the circuit of FIG. 3, however, two resistors, R3 and R4 are used to provide the appropriate base voltage to NPN transistor Q4. Resistors R1 and R5 have been added between the collector of Q4 and the gate of the pass transistor Q1. Additionally, capacitor C1 is included, connected between ground and the junction of resistors R1 and Rg. The resistor R1 is selected in accordance with common design practice, to prevent parasitic induced self-oscillation of pass transistor Q1. Capacitor C1 is chosen to provide gate overdrive for transistor Q1 during circuit power up, and to filter the gate from noise. Resistor R5 limits the magnitude of capacitor C1 discharge current into the collector of transistor Q4 during a switching transition.

Figure 4:
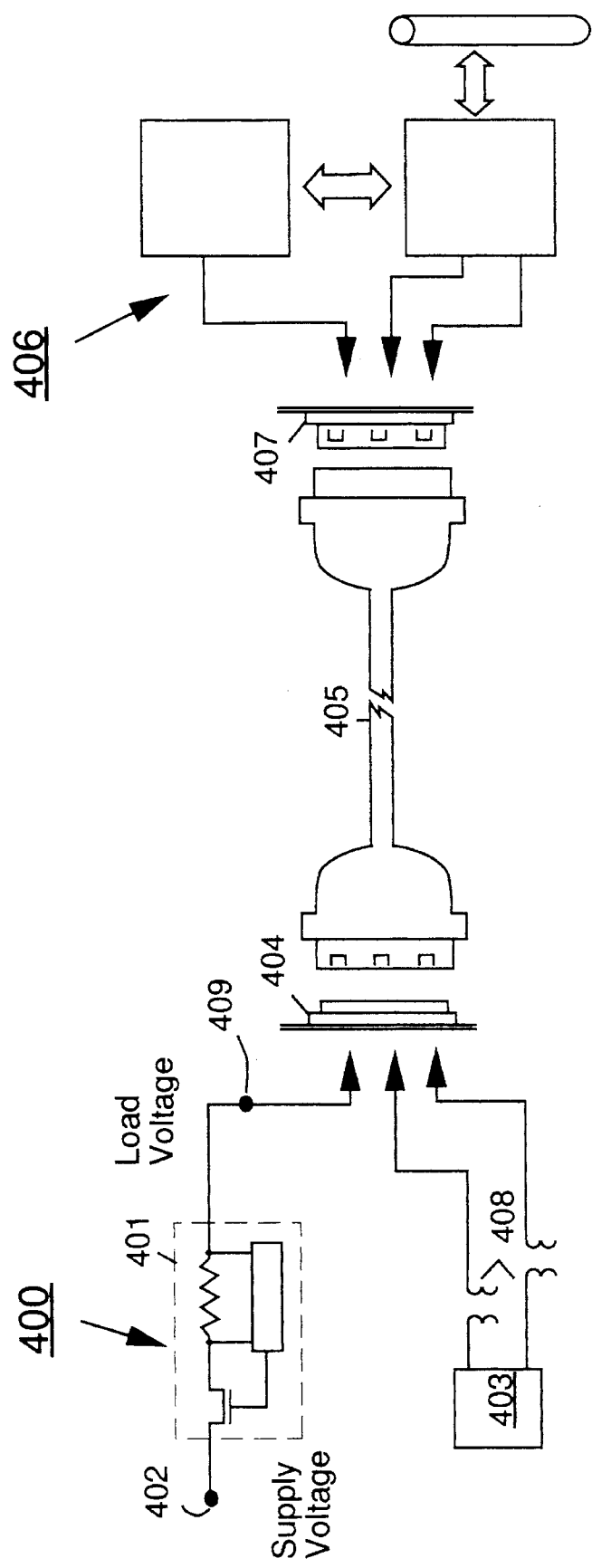
FIG. 4 shows the detail of an Ethernet AUI port device and how the invention is used in such a device.

FIG. 4 shows how the overcurrent protection circuit of FIG. 3 is used with an Ethernet LAN. The overcurrent protection circuit 401 is used in a LAN interface subsystem 400. One or more of such subsystems are built on a circuit card, in some cases with some other subsystems or components. The particular design shown is of an attachment unit interface (AUI) found in Ethernet data terminal equipment (DTE). A LAN connector 404 interfaces the subsystem to a LAN cable 405, which in turn is connected through another LAN connector 407 to a device such as a medium attachment unit (MAU) 406.

Within the LAN interface subsystem, the LAN signalling and control circuitry 403 is connected to the LAN connector 404 through one or more coupling transformers 408. A power supply terminal 402 supplies power to the overcurrent protection circuit 401 which in turn supplies power to a load terminal 409 which is connected to a pin or socket in the LAN connector 404.

While the preferred embodiment of the overcurrent protection circuit is used in an Ethernet AUI interface, the circuit has general applicability. One skilled in the art of power circuits could easily modify the design for any application, including applications in other types of LANs and non-LAN applications.

We claim:

1. An overcurrent protection circuit comprising:

one input voltage terminal;

a load terminal;

a normally-on field-effect pass transistor and a sense resistor disposed in series between the input voltage terminal and the load terminal, the pass transistor being turned off by a voltage at a gate terminal;

a transistor array having first, second, third and fourth terminals, and having the second terminal connected to the load terminal;

a reference resistor connected between the first terminal of the transistor array and a point between the pass transistor and the sense resistor;

means for providing a constant reference current through the reference resistor, the means disposed between the third terminal of the transistor array and ground;

a resistor disposed to receive current flowing from the fourth terminal of the transistor array to ground;

a resistor disposed between the input voltage terminal and the gate of the pass transistor; and one NPN transistor disposed for current sensing having an emitter terminal connected to ground, a base terminal connected to the resistor receiving current from the fourth terminal of the transistor array, and a collector terminal connected to apply a voltage to the gate terminal of the pass transistor so that when the current flowing from the fourth terminal of the transistor array to ground is substantially less than the constant current, the pass transistor is shut off.

2. The overcurrent protection circuit of claim 1 wherein the transistor array comprises:

first and second PNP transistors, the first PNP transistor having an emitter terminal coterminous with the first terminal of the transistor array, and having base and collector terminals both coterminous with the third terminal of the transistor array, the second PNP transistor disposed between the second and fourth terminals of the transistor array and having a base terminal connected to the base terminal of the first PNP transistor.

3. The overcurrent protection circuit of claim 1 further comprising:

a resistor disposed between the fourth terminal of the transistor array and the base terminal of the NPN transistor;

a pair of resistors disposed in series between the collector terminal of the NPN transistor and the input voltage terminal; and a resistor and a capacitor disposed in series between the gate terminal of the pass transistor and ground, and having a point in between the resistor and the capacitor connected to a point in between the two resistors of the pair of resistors.

4. The overcurrent protection circuit of claim 3 wherein the transistor array comprises:

first and second PNP transistors, the first PNP transistor having an emitter terminal coterminous with the first terminal of the transistor array, and having base and collector terminals both coterminous with the third terminal of the transistor array, the second PNP transistor disposed between the second and fourth terminals of the transistor array and having a base terminal connected to the base terminal of the first PNP transistor.

5. An overcurrent protection circuit according to any of claims 1, 3, 2, or 4 wherein the means for providing a constant reference current comprises a single fixed resistor.

6. A circuit card having one or more local area network (LAN) interface subsystems, each subsystem comprising:

one power supply terminal;

a LAN connector;

circuitry for LAN signaling and control;

one or more coupling transformers disposed between the circuitry for LAN signaling and control and the LAN connector; and an overcurrent protection circuit disposed between the power supply terminal and the LAN connector, the overcurrent protection circuit comprising:

an input terminal connected to the power supply terminal;

a load terminal connected to a terminal in the LAN connector;

a normally-on field-effect pass transistor and a sense resistor disposed in series between the input terminal and the load terminal, the pass transistor being turned off by a voltage at a gate terminal;

a transistor array having first, second, third and fourth terminals, and having the second terminal connected to the load terminal;

a reference resistor connected between the first terminal of the transistor array and a point between the pass transistor and the sense resistor;

means for providing a constant reference current through the reference resistor, the means disposed between the third terminal of the transistor array and ground;

a resistor disposed to receive current flowing from the fourth terminal of the transistor array to ground;

a resistor disposed between the input voltage terminal and the gate of the pass transistor; and one NPN transistor disposed for current sensing having an emitter terminal connected to ground, a base terminal connected to the resistor receiving current from the fourth terminal of the transistor array, and a collector terminal connected to apply voltage to the gate terminal of the pass transistor so that when the current flowing from the fourth terminal of the transistor array to ground is substantially less than the constant current, the pass transistor is shut off.

7. The circuit card of claim 6 wherein each overcurrent protection circuit further comprises:

a resistor disposed between the fourth terminal of the transistor array and the base terminal of the NPN transistor;

a pair of resistors disposed in series between the collector terminal of the NPN transistor and the input terminal; and a resistor and a capacitor disposed in series between the gate terminal of the pass transistor and ground, and having a point in between the resistor and the capacitor connected to a point in between the two resistors of the pair of resistors.

8. The circuit card of claim 7 wherein each transistor array comprises:

first and second PNP transistors, the first PNP transistor having an emitter terminal coterminous with the first terminal of the transistor array, and having base and collector terminals both coterminous with the third terminal of the transistor array, the second PNP transistor disposed between the second and fourth terminals of the transistor array and having a base terminal connected to the base terminal of the first PNP transistor.

9. The circuit card of claim 6 wherein each transistor array comprises:

first and second PNP transistors, the first PNP transistor having an emitter terminal coterminous with the first terminal of the transistor array, and having base and collector terminals both coterminous with the third terminal of the transistor array, the second PNP transistor disposed between the second and fourth terminals of the transistor array and having a base terminal connected to the base terminal of the first PNP transistor.

10. A circuit card according to any of claims 6, 7, 9, or 8 wherein each means for providing a constant reference current comprises a single fixed resistor.

* * * * *